US010479561B2

(12) United States Patent
Nakatani et al.

(10) Patent No.: US 10,479,561 B2
(45) Date of Patent: Nov. 19, 2019

(54) STOPPER

(71) Applicant: PacPlus Co., Ltd., Osaka-shi, Osaka (JP)

(72) Inventors: Tomoaki Nakatani, Osaka (JP); Naohiro Nakata, Osaka (JP)

(73) Assignee: PacPlus Co., Ltd., Osaka-shi, Osaka (JP)

( * ) Notice: Subject to any disclaimer, the term of this patent is extended or adjusted under 35 U.S.C. 154(b) by 105 days.

(21) Appl. No.: 15/571,396

(22) PCT Filed: Jun. 29, 2016

(86) PCT No.: PCT/JP2016/069210
§ 371 (c)(1),
(2) Date: Nov. 2, 2017

(87) PCT Pub. No.: WO2017/026184
PCT Pub. Date: Feb. 16, 2017

(65) Prior Publication Data
US 2019/0002164 A1 Jan. 3, 2019

(30) Foreign Application Priority Data
Aug. 7, 2015 (JP) ................................ 2015-156807

(51) Int. Cl.
*B65D 51/18* (2006.01)
*B65D 39/04* (2006.01)
(Continued)

(52) U.S. Cl.
CPC .......... *B65D 39/04* (2013.01); *B01L 3/50825* (2013.01); *B65D 39/0088* (2013.01); *B65D 2539/003* (2013.01); *B65D 2539/005* (2013.01)

(58) Field of Classification Search
CPC ........... B01L 3/50825; B01L 2300/042; B65D 51/18; B65D 51/002; B65D 51/241;
(Continued)

(56) References Cited

U.S. PATENT DOCUMENTS 412,959 A * 10/1889 Kane .................... B65D 39/084 16/2.4
905,385 A * 12/1908 Swahn .................. B65D 39/12 215/358
(Continued)

FOREIGN PATENT DOCUMENTS

JP 35-13398 U 6/1960
JP 2000-333352 A 11/2000
(Continued)

OTHER PUBLICATIONS

International Search Report dated Aug. 30, 2016 issued in corresponding PCT/JP2016/069210 application (2 pages).
(Continued)

*Primary Examiner* — Gideon R Weinerth
(74) *Attorney, Agent, or Firm* — Millen, White, Zelano & Branigan, P.C.; William Nixon

(57) ABSTRACT

The stopper is equipped with a stopper main body having a guiding path extending in an axial direction. A stopper member has a flow path extending in the axial direction and is inserted in the guiding path of the stopper main body. A sealing member inserts into the flow path of the stopper member in such a manner as to block the flow path. The stopper member is equipped with, at a position where the sealing member is inserted, a first peripheral wall section fixed in a manner as to extend in the axial direction and a second peripheral wall section separated from the first peripheral wall section in a circumferential direction and extending radially outward along the axial direction.

11 Claims, 6 Drawing Sheets

(51) Int. Cl.
*B65D 39/12* (2006.01)
*B01L 3/00* (2006.01)
*B65D 39/00* (2006.01)

(58) Field of Classification Search
CPC .... B65D 39/00; B65D 39/0088; B65D 39/04; B65D 2539/04; B65D 2539/003; B65D 2539/006; B65D 2539/005; B65D 45/322; B65D 47/141; B65D 47/30; B65D 39/12; B65D 39/0082; B65D 47/121; A61B 5/150351; A61B 5/150572; A61B 1/00137; A61J 1/1406; A61J 1/1412; A61J 1/05; A61M 39/04; Y10S 215/03; Y10S 220/19; Y10S 411/913; F16L 55/136; F16L 55/13; F16L 55/1141; F16L 37/24
USPC ......... 215/296, 247, 276; 604/415; 422/550, 422/916
See application file for complete search history.

(56) References Cited

U.S. PATENT DOCUMENTS

| | | | | | |
|---|---|---|---|---|---|
| 970,538 | A * | 9/1910 | O'Brien | B65D 39/04 | 215/279 |
| 1,116,663 | A * | 11/1914 | Woodruff | B65D 39/00 | 215/233 |
| 1,204,712 | A * | 11/1916 | Spelling | B65D 39/16 | 215/299 |
| 1,255,079 | A * | 1/1918 | Cedervall | B01L 3/5021 | 215/273 |
| 1,411,179 | A * | 3/1922 | Pavlica | B65D 55/04 | 215/14 |
| 1,999,113 | A * | 4/1935 | Shapiro | B65D 55/04 | 215/250 |
| 2,657,817 | A * | 11/1953 | Victor | B65D 39/082 | 217/110 |
| 3,385,158 | A * | 5/1968 | Morin | F16B 19/1081 | 264/250 |
| 3,451,583 | A * | 6/1969 | Leighton | F16J 13/02 | 138/89 |
| 4,113,006 | A * | 9/1978 | Clapp | F16L 55/11 | 138/89 |
| 4,889,251 | A * | 12/1989 | Hojnoski | B65D 39/16 | 215/296 |
| 4,952,106 | A * | 8/1990 | Kubogochi | F16B 19/1081 | 411/48 |
| 5,259,689 | A * | 11/1993 | Arand | F16B 21/065 | 403/337 |
| 5,294,011 | A * | 3/1994 | Konrad | B01L 3/50825 | 215/247 |
| 5,704,752 | A * | 1/1998 | Logerot | F16B 19/1081 | 411/503 |
| 5,722,548 | A * | 3/1998 | Hojnoski | B65D 39/16 | 215/296 |
| 5,779,085 | A * | 7/1998 | Havlinek | F16L 55/11 | 215/361 |
| 5,803,285 | A * | 9/1998 | Hirota | B65D 39/16 | 215/296 |
| RE36,289 | E * | 8/1999 | Le | A61B 17/0401 | 606/232 |
| 6,536,618 | B1 * | 3/2003 | Hwang | B65D 39/04 | 215/358 |
| 6,719,160 | B2 * | 4/2004 | Sen-Yih | B65D 39/12 | 215/361 |
| 6,749,384 | B1 * | 6/2004 | Ellis | F16B 19/1081 | 411/45 |
| 7,914,220 | B2 | 3/2011 | Neuner et al. | | |
| 9,044,313 | B2 * | 6/2015 | Heaven | A61F 2/0805 | |
| 9,775,597 | B2 * | 10/2017 | Heaven | A61B 17/0401 | |
| 2004/0112856 | A1 * | 6/2004 | Hwang | B65D 39/0076 | 215/361 |
| 2004/0178167 | A1 * | 9/2004 | Lin | B65D 39/0076 | 215/360 |
| 2006/0198689 | A1 | 9/2006 | Neuner et al. | | |
| 2008/0116165 | A1 * | 5/2008 | Lin | B65D 39/12 | 215/294 |
| 2011/0170982 | A1 * | 7/2011 | Watanabe | F16B 19/1081 | 411/360 |
| 2013/0134122 | A1 * | 5/2013 | Niunoya | A61B 5/150351 | 215/228 |
| 2016/0039578 | A1 * | 2/2016 | Karam | B65D 51/002 | 215/261 |
| 2019/0002164 | A1 * | 1/2019 | Nakatani | A61J 1/05 | |

FOREIGN PATENT DOCUMENTS

| | | |
|---|---|---|
| JP | 2008-531196 A | 8/2008 |
| JP | 2000-333352 A | 6/2013 |

OTHER PUBLICATIONS

English Abstract of JP 2000-333352 A published Nov. 30, 2000.
English Abstract of JP 2013-107692 A published Jun. 6, 2013.

* cited by examiner (a)

(b)

(a)

(b)

STOPPER

TECHNICAL FIELD

The present invention relates to a stopper for closing a container after filling a fluid including various kinds of fluids, such as, e.g., chemicals, cosmetics, drugs and medicines, detergents, foods, beverages, adhesives, paint, and ink and thereafter discharging the fluid filled in the container.

BACKGROUND ART

Conventionally, as a stopper for closing a container after filling a fluid including various kinds of fluids, such as, e.g., chemicals, cosmetics, drugs and medicines, detergents, foods, beverages, adhesives, paint, and ink and thereafter discharging the fluid filled in the container, a stopper according to Patent Document 1 is known.

The stopper according to Patent Document 1 is equipped with a stopper main body having a guiding path extending in the axial direction and configured to be fixed to an inlet and outlet opening of a container, a first stopper member for filling a fluid in the container, and a second stopper member for closing the guiding path of the stopper main body. A fluid is supplied into the container when the first stopper member is inserted into the guiding path of the stopper main body. The stopper main body is closed by inserting the second stopper member into the guiding path of the stopper main body. A discharge needle is inserted through the second stopper member, so that the fluid filled in the container is discharged to the outside. With this configuration, it becomes possible to easily and reliably perform a series of operations of filling the fluid, closing the container, and discharging the fluid while preventing possible leakage of fluid and/or inclusion of air.

By the way, in such a stopper, it is extremely important how the stopper member (second stopper member) locks the sealing member, and various proposals have been made on the method of locking the sealing member by the stopper member.

For example, the stopper member 2' shown in FIG. 6(*a*) has a plurality of peripheral wall sections 27' divided in the circumferential direction, and both end portions of each peripheral wall section 27' are fixed to the stopper member. According to this, a sealing member can be easily inserted into the stopper member, which is convenient. However, after inserting the stopper member into which the sealing member is inserted into the stopper main body, when the discharge needle is inserted through the sealing member and then pulled out of the sealing member, there is a possibility that the sealing member comes off from the stopper member together with the discharge needle. Of course, if the outer diameter of the sealing member is increased, the sealing member becomes less likely to come off from the stopper member, but this makes it difficult to insert the sealing member into the stopper member.

On the other hand, the stopper member 2' shown in FIG. 6(*b*) has a plurality of peripheral wall sections 28' completely divided in the circumferential direction, and each peripheral wall section 28' is provided with a protrusion 28*b*' protruding radially inward. According to this configuration, when the stopper member is inserted into the stopper main body, the protrusion 28*b*' of each peripheral wall section 28' locks the base end face of a sealing member. This eliminates the possibility that the sealing member comes off from the stopper member. However, in order to insert a sealing member into the stopper member 2', each peripheral wall section 28' of the stopper member 2' had to be opened radially outward. Therefore, it was difficult to insert the sealing member into the stopper member 2'. Further, when inserting a sealing member into the stopper member 2', if an excessive force is applied to each peripheral wall section 28', there is a possibility that each peripheral wall section 28' is deformed, resulting in malfunction thereof.

PRIOR ART

Patent Document

[Patent Document 1] PCT/JP2014/53078

SUMMARY OF THE INVENTION

Problems to be Solved by the Invention

As described above, in a conventional stopper, if it is configured such that a sealing member can be easily inserted into a stopper member, there is a problem that the sealing member comes out of the stopper member, which deteriorates the quality of the product. On the other hand, if it is configured such that a sealing member is less likely to come out of the stopper member, there is a problem that it becomes difficult to insert the sealing member into the stopper member, which deteriorates the manufacturing efficiency of the product.

The present invention was made in view of the aforementioned problems, and aims to provide a stopper in which a sealing member can be easily inserted into a stopper member and can prevent the sealing member from coming out of the stopper member, which in turn can improve both manufacturing efficiency and manufacturing efficiency.

Means for Solving the Problems

In order to attain the aforementioned purpose, the present invention provides a stopper including: a stopper main body having a guiding path extending in an axial direction; a stopper member having a flow path extending in the axial direction and configured to be inserted in the guiding path of the stopper main body; and a sealing member to be inserted in the flow path of the stopper member in such a manner as to close the flow path. The stopper member is provided with, at a position where the sealing member is inserted, a first peripheral wall section fixed in such a manner as to extend in the axial direction and a second peripheral wall section separated from the first peripheral wall section in a circumferential direction and extending obliquely radially outward along the axial direction.

According to this, when the sealing member is inserted into the flow path of the stopper member, the first peripheral wall section locks the sealing member, while since the second peripheral wall section extends obliquely radially outward, the sealing member can be easily inserted into the stopper member. Further, when the stopper member into which the sealing member is inserted is inserted into the guiding path of the stopper main body, in a state in which the first peripheral wall section locks the sealing member, the second peripheral wall section further locks the sealing member by being bent radially inward in such a manner as to be pressed by the guiding path of the stopper main body. As a result, the sealing member can be prevented from coming out of the stopper member. Moreover, since the second peripheral wall section locks the sealing member in such a manner as to tighten the sealing member, the stopper can withstand plural times of insertion/extraction of a discharge needle.

The second peripheral wall section is preferably provided with a protrusion protruding radially outward or radially inward on an outer surface thereof or an inner surface thereof. According to this configuration, when the stopper member is inserted into the guiding path of the stopper main body, the second peripheral wall section is bent radially inwardly than the first peripheral wall section in such a manner as to be pressed by the guiding path of the stopper main body to thereby assuredly tighten the sealing member. As a result, the sealing member is locked more assuredly.

Further, the second peripheral wall section is preferably provided with a protrusion protruding radially inward on an inner surface of a tip end portion thereof. According to this configuration, when the stopper member into which the sealing member is inserted is inserted into the guiding path of the stopper main body, the protrusion provided on the inner surface of the tip end portion so as to protrude radially inward can lock the end face of the sealing member. As a result, the sealing member can be more reliably prevented from coming out of the stopper member.

Further, it is preferable that the stopper member be provided with an annular third peripheral wall section having rigidity at a base end portion thereof and that the first peripheral wall section be connected to the third peripheral wall section. According to this configuration, the base end portion of the stopper member becomes less likely to be deformed, which enables easier insertion of the sealing member into the stopper member.

Further, a container according to the present invention is provided with the aforementioned stopper.

Effects of the Invention

According to the present invention, when the sealing member is inserted into the flow path of the stopper member, the first peripheral wall section locks the sealing member, while since the second peripheral wall section extends radially outward, the sealing member can be easily inserted into the stopper member. Further, when the stopper member into which the sealing member is inserted is inserted into the guiding path of the stopper main body, in a state in which the first peripheral wall section locks the sealing member, the second peripheral wall section further locks the sealing member by being bent radially inward in such a manner as to be pressed by the guiding path of the stopper main body. As a result, the sealing member can be prevented from coming out of the stopper member. Moreover, since the second peripheral wall section locks the sealing member in such a manner as to tighten the sealing member, the stopper can withstand plural times of insertion/extraction of a discharge needle. Therefore, it becomes possible to improve both product quality and manufacturing efficiency of the stopper.

EMBODIMENTS FOR CARRYING OUT THE INVENTION

Figure 1:
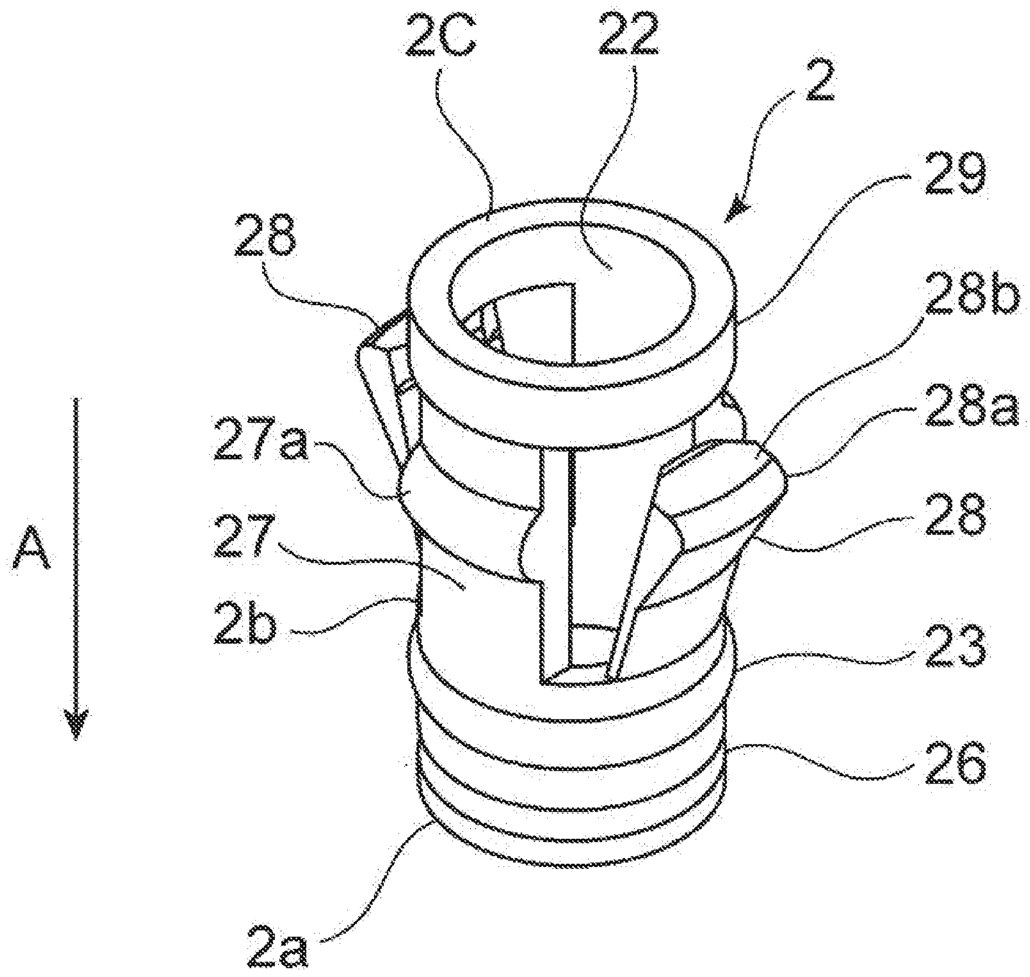
FIG. 1 is a perspective view of a stopper member according to a stopper according to the present invention.

Next, embodiments of a stopper according to the present invention will be described with reference to FIGS. 1 to 5.

This stopper is provided with a stopper main body 1 having a guiding path 10 extending in the axial direction, a stopper member 2 to be inserted into the guiding path 10 of the stopper main body 1, and a sealing member 3 to be inserted into a flow path 22 of the stopper member 2 in such a manner as to close the flow path 22. When a discharge needle 4 is inserted through the sealing member 3, a fluid in a container P is discharged to the outside.

Figure 2:
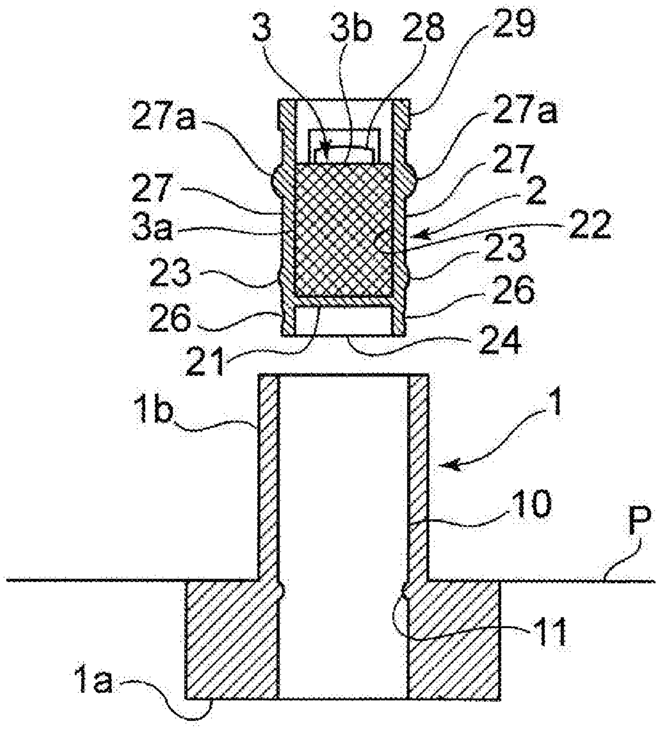
FIG. 2 illustrates (a) a longitudinal cross-sectional view of a first peripheral wall section side and (b) a longitudinal cross-sectional view of a second peripheral wall section side, each showing a state before a stopper member of the stopper is inserted into a stopper main body.
Figure 2:
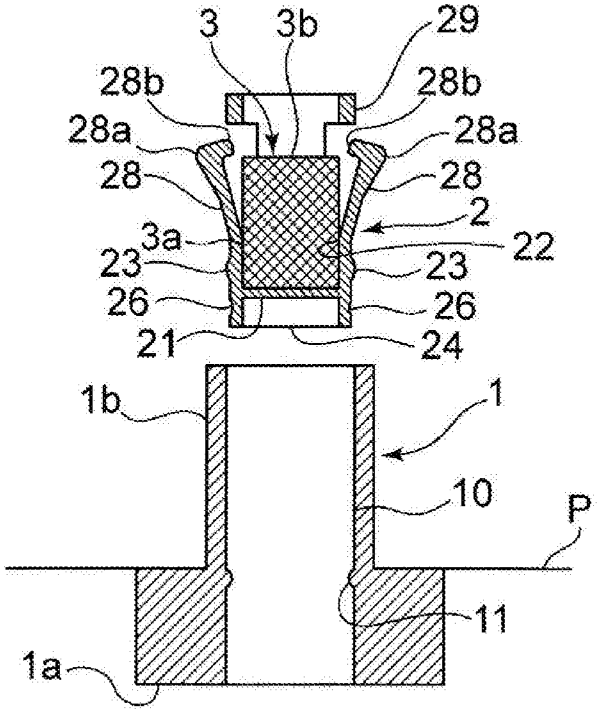

As shown in FIG. 2, the stopper main body 1 is a synthetic resin member to be attached to an inlet and outlet opening of a container P, and is provided therein with a guiding path 10 extending in the axial direction. This guiding path 10 penetrates from the tip end portion 1*a* of the stopper main body 1 to the base end portion 1*b* thereof. The tip end portion 1*a* opens toward the inside of the container P and the base end portion 1*b* opens toward the outside of the container P.

Further, the stopper main body 1 is provided with an annular rib 11 protruding radially inward in the guiding path 10 of the tip end portion 1*a*. This annular rib 11 fits in a recess 26 of the stopper member 2 when the stopper member 2 is inserted into the guiding path 10 of the stopper main body 1 as will be described later.

As shown in FIG. 1, the stopper member 2 is a synthetic resin member formed in a substantially columnar shape, and is provided therein with a flow path 22 extending in the axial direction in the stopper member 2.

Further, the stopper member 2 is provided with a flow opening 24 formed on the end face of the tip end portion 2*a*. This flow opening 24 is communicated with the flow path 22 in the stopper member. Therefore, when the discharge needle 4 is inserted through the sealing member 3 in such a manner as to penetrate it, the fluid in the container P flows into the flow path 22 via the flow opening 24 and is discharged to the outside of the container P through the discharge needle 4.

The stopper member 2 is provided with a recess 26 formed on the tip end portion 2*a*, so that the annular rib 11 of the stopper main body 1 is fitted in the recess 26. With this, the stopper member 2 is immovably fixed in the guiding path 10 of the stopper main body 1.

The stopper member 2 is formed to have an outer diameter equal to or slightly smaller than the inner diameter of the guiding path 10 of the stopper main body 1, and is provided with an annular airtightness maintaining portion 23 on the outer peripheral surface. Since the airtightness maintaining portion 23 is formed to be slightly larger in diameter than the inner diameter of the guiding path 10 of the stopper main body 1, when the stopper member 2 is inserted into the guiding path 10 of the stopper main body 1, the stopper member 2 comes into close contact with the guiding path 10 of the stopper main body 1 to maintain airtightness.

Further, the stopper member 2 is provided with, at a position where the sealing member 3 is arranged, two first peripheral wall sections 27 fixed in such a manner as to extend in the axial direction, two second peripheral wall sections 28 divided in such a manner as to open radially outward along the axial direction, and a rigid annular third peripheral wall section 29.

The first peripheral wall sections 27 are provided in such a manner as to oppose each other in the radial direction of the stopper member 2. One end (the lower end in FIG. 1) thereof is fixed to the tip end portion 2*a* of the stopper member 2, and the other end (the upper end in FIG. 1) thereof is fixed to the base end portion 2*c* (the third peripheral wall section 29). Therefore, when the sealing member 3 is inserted into the flow path 22 of the stopper member 2, the first peripheral wall sections 27 locks the sealing member 3 in such a manner as to sandwich the peripheral surface 3*a* of the sealing member 3 from both sides. Further, when the stopper member 2 is inserted into the guiding path 10 of the stopper main body 1, the first peripheral wall sections 27 maintain the state of locking the peripheral surface 3*a* of the sealing member 3.

In particular, in this embodiment, a protrusion 27*a* protruding radially outward is formed at the axially central portion of the first peripheral wall section 27. Therefore, when the stopper member 2 is inserted into the guiding path 10 of the stopper main body 1, the axially central portion of the first peripheral wall section 27 is bent radially inward in such a manner as to be pushed by the guiding path 10 of the stopper main body 1 via the protrusion 27*a*, so that the axially central portion of the first peripheral wall section 27 assuredly locks the peripheral surface 3*a* of the sealing member 3 in a tightening manner.

The second peripheral wall sections 28 are provided in such a manner as to oppose each other in the radial direction of the stopper member 2. The base end (the lower end in FIG. 1) is fixed to the main body of the stopper member 2 and the tip end portion (the upper end portion in FIG. 1) gradually opens radially outward along the axial direction. In this embodiment, it is configured such that the second peripheral wall section 28 gradually opens radially outward along a direction opposite to the direction A along which the stopper member 2 is inserted into the guiding path 10 of the stopper main body 1.

For this reason, when inserting the sealing member 3 into the flow path 22 of the stopper member 2, the second peripheral wall section 28 does not lock the sealing member 3, so that the sealing member 3 can be easily inserted into the flow path 22 of the stopper member 2. Further, when the stopper member 2 is inserted into the guiding path 10 of the stopper main body 1, the second peripheral wall section 28 is bent radially inward in such a manner as to be pushed by the guiding path 10 of the stopper main body 1 to thereby lock the sealing member 3. Therefore, it is possible to prevent the sealing member 3 from coming out of the stopper member 2. Moreover, the second peripheral wall section 28 locks the sealing member 3 in such a manner as to tighten the sealing member, so that the stopper can withstand plural times of insertion/extraction of a discharge needle 4.

In particular, in this embodiment, the second peripheral wall section 28 is provided with a protrusion 28*a* protruding radially outward on the outer surface of the tip end portion. Therefore, when the stopper member 2 is inserted into the guiding path 10 of the stopper main body 1, the second peripheral wall section 28 is bent radially inward than the first peripheral wall section 27 in such a manner as to be pushed by the guiding path 10 of the stopper main body 1 to thereby assuredly tighten the peripheral surface 3*a* of the sealing member 3. As a result, the sealing member 3 can be more reliably locked.

Further, the second peripheral wall section 28 is provided with a protrusion 28*b* protruding radially inward on the inner surface of the tip end portion. Therefore, when the stopper member 2 is inserted into the guiding path 10 of the stopper main body 1, the protrusion 28*b* locks the base end face 3*b* of the sealing member 3 in such a manner as to press against it. This more assuredly prevents the sealing member 3 from coming out of the stopper member 2.

Further, the third peripheral wall section 29 is connected to the first peripheral wall sections 27 with the other end of each first peripheral wall section 27 connected to the third peripheral wall section 29. With this, the base end portion 2*c* of the stopper member 2 becomes less likely to be deformed, which enables easier insertion of the sealing member 3 into the stopper member 2.

The flow path 22 is provided with a partition wall 21 at the tip end portion 2*a* of the stopper member 2, so that the flow path 22 is partitioned into a side of the base end portion 2*c* and the intermediate portion 2*b* of the stopper member and a side of the tip end portion 2*a* of the stopper member. This partition wall 21 prevents the sealing member 3 inserted into the flow path 22 from being deteriorated due to contact with a fluid in the container P. The partition wall 21 is preferably formed to be thin so that a discharge needle 4 can easily penetrate.

The sealing member 3 is made of an elastic material such as rubber, and is inserted into the flow path 22 (the upper side of the partition wall 21) of the stopper member 2. This sealing member 3 is formed to have a diameter which is the same as or slightly larger than the inner diameter of the first peripheral wall section 27 before the stopper member 2 is inserted into the guiding path 10 of the stopper main body 1. When inserted into the flow path 22 of the stopper member 2 as described above, the sealing member 3 is locked by the first peripheral wall section 27 of the stopper member 2. The sealing member 3 is formed to be shorter than the length of the second peripheral wall section 28 by the length of the protrusion 28*b*, so that the base end face 3*b* is locked by the protrusion 28*b* of the second peripheral wall section 28 as described above.

In addition, since the sealing member 3 is made of an elastic material such as rubber, when a discharge needle 4 is inserted through the sealing member 3 in a penetrating manner, the sealing member 3 comes into close contact with the discharge needle 4. This hardly causes a gap therebetween and prevents scrap marks from remaining even after pulling out the discharge needle 4, which in turn prevents fluid leakage and air inclusion.

Next, the method of using this stopper will be described.

First, the sealing member 3 is inserted into the flow path 22 from the base end portion 2*c* of the stopper member 2 until it comes into contact with the partition wall 21 of the flow path 22.

At this time, as shown in FIG. 2(*a*), the first peripheral wall section 27 locks the peripheral surface 3*a* of the sealing member 3 in such a manner as to sandwich from both sides.

On the other hand, as shown in FIG. 2(*b*), the second peripheral wall section 28 does not lock the sealing member 3 since it opens radially outward. Therefore, the sealing member 3 is temporarily locked only by the first peripheral wall section 27, so that the sealing member 3 can be easily inserted into the flow path 22 of the stopper member 2.

Figure 3:
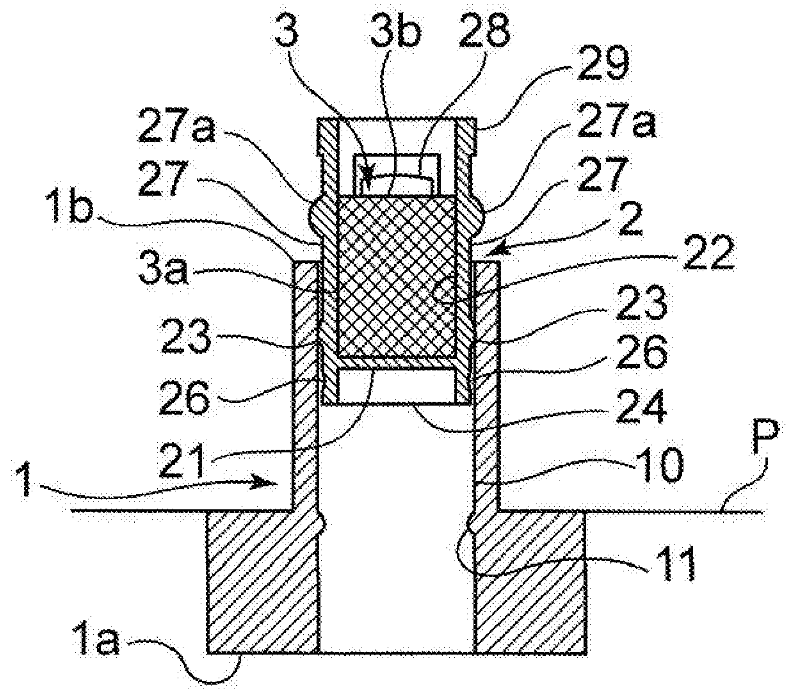
FIG. 3 illustrates (a) a longitudinal cross-sectional view of the first peripheral wall section side and (b) a longitudinal cross-sectional view of the second peripheral wall section side, each showing a state in which the stopper member of the stopper is being inserted into the stopper main body.
Figure 3:
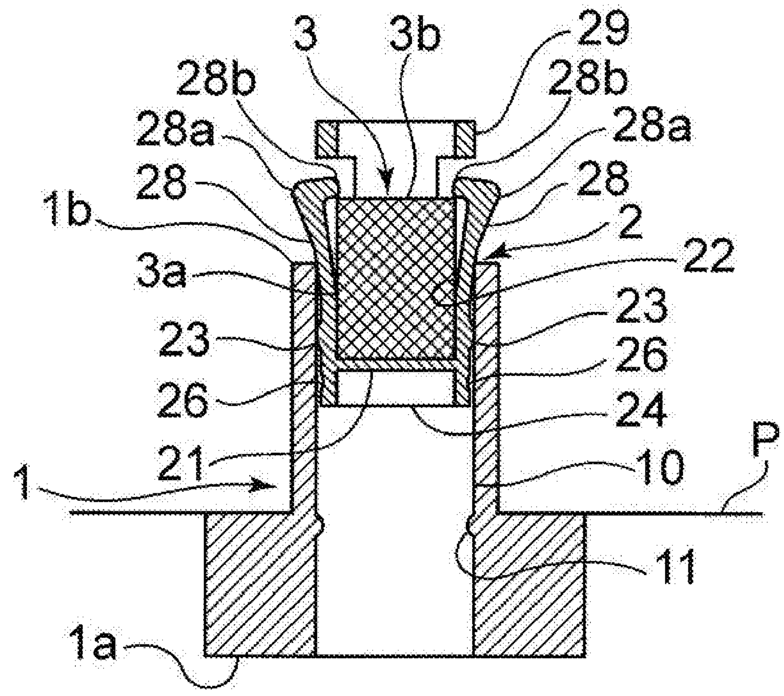

Next, as shown in FIG. 3, the stopper member 2 in which the sealing member 3 is inserted is inserted into the guiding path 10 of the stopper main body 1.

At this time, as shown in FIG. 3(*a*), the first peripheral wall section 27 maintains the state in which the peripheral wall section 27 locks the peripheral surface 3*a* of the sealing member 3. On the other hand, as shown in FIG. 3(*b*), as the stopper member 2 is inserted into the guiding path 10 of the stopper main body 1, the second peripheral wall section 28 is gradually bent radially inward of the flow path 22 in such a manner that the second peripheral wall section 28 is pushed by the guiding path 10 of the stopper main body 1. Thus, the second peripheral wall section 28 locks the sealing member 3 in such a manner as to gradually tighten the peripheral surface 3*a* of the sealing member 3.

Figure 4:
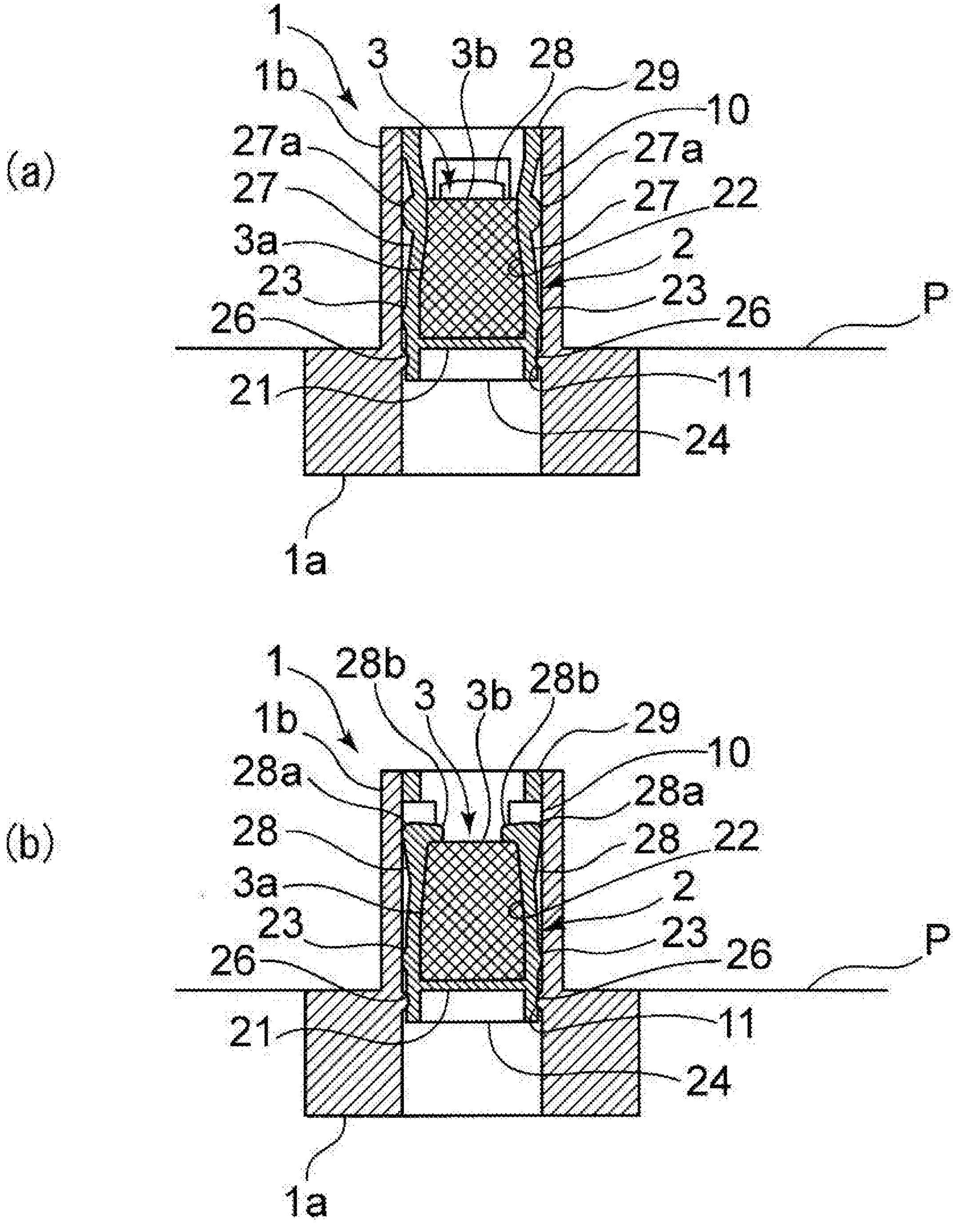
FIG. 4 illustrates (a) a longitudinal cross-sectional view of the first peripheral wall section side and (b) a longitudinal cross-sectional view of the second peripheral wall section side, each showing a state after the stopper member of the stopper is inserted into the stopper main body.

Next, as shown in FIG. 4, the stopper member 2 in which the sealing member 3 is inserted is further inserted into the guiding path 10 of the stopper main body 1 until the annular rib 11 of the stopper main body 1 is fitted in the recess 26 of the stopper member 2.

At this time, as shown in FIG. 4(*a*), the first peripheral wall section 27 maintains the state of locking the peripheral surface 3*a* of the sealing member 3. In particular, in this embodiment, since the protrusion 27*a* is provided on the outer surface of the longitudinal central portion of the first peripheral wall section 27, the central portion of the first peripheral wall section 27 is bent radially inward in such a manner as to be pushed by the guiding path 10 of the stopper main body 1 via the protrusion 27*a* to thereby lock the peripheral surface 3*a* of the sealing member 3 in a tightening manner.

On the other hand, as shown in FIG. 4(*b*), as the stopper member 2 is inserted into the guiding path 10 of the stopper main body 1, the second peripheral wall section 28 is further bent radially inwardly of the flow path 22 in such a manner as to be pushed by the guiding path 10 of the stopper main body 1. Thus, the second peripheral wall section 28 locks the peripheral surface 3*a* of the sealing member 3 in a completely tightening manner, and the protrusion 28*b* locks the base end face 3*b* of the sealing member 3 in such a manner as to press downward.

Figure 5:
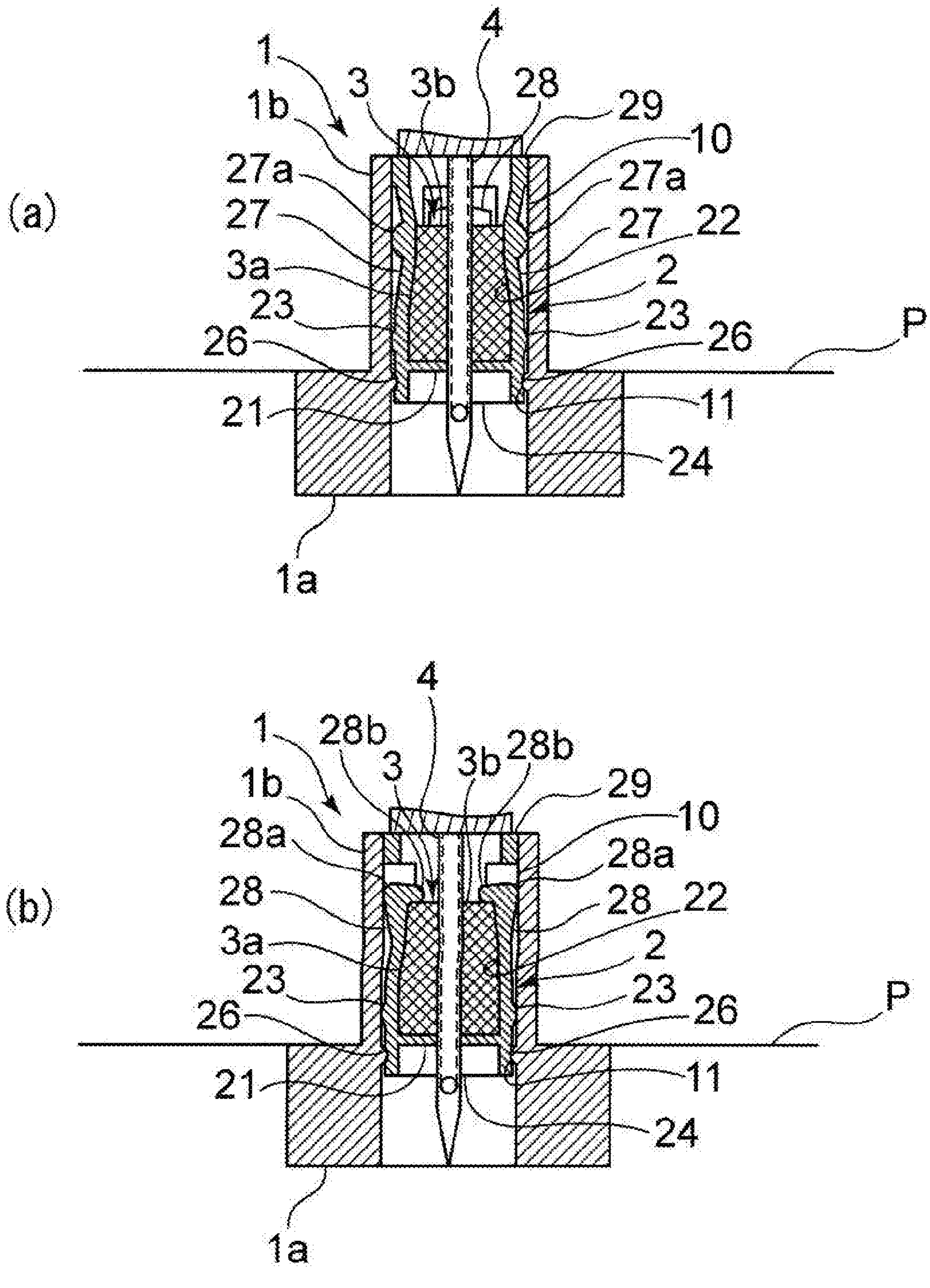
FIG. 5 illustrates (a) a longitudinal cross-sectional view of the first peripheral wall section side and (b) a longitudinal cross-sectional view of the second peripheral wall section side, each showing a state in which a discharge needle is inserted through the stopper main body.
Figure 6:
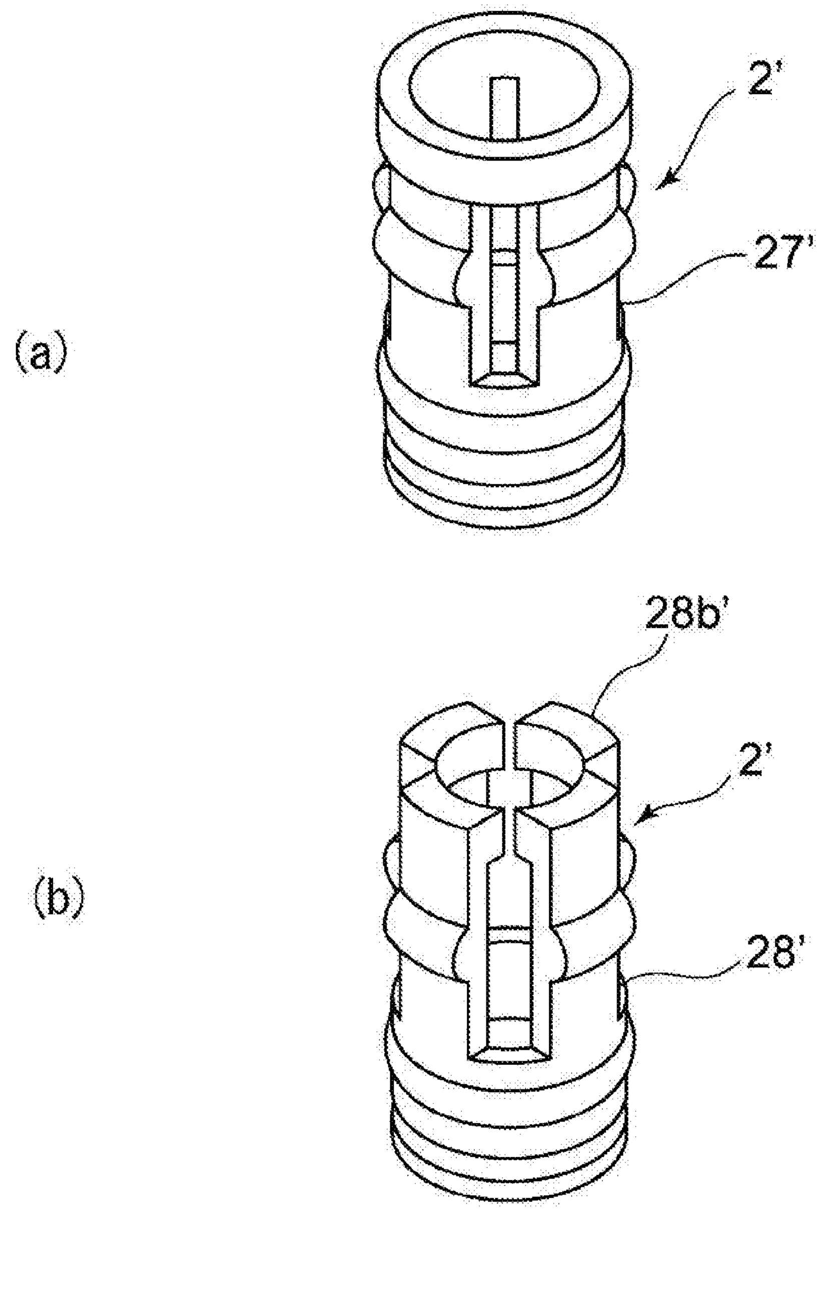
FIG. 6 is a perspective view of a conventional stopper.

After that, as shown in FIG. 5, when a discharge needle 4 attached to a container (not shown) or the like is inserted through the sealing member 3 and the partition wall 21 in a penetrating manner, the fluid in the container P flows into the flow path 22 via the flow opening 24 and is discharged to the outside of the container P through the discharge needle 4.

When the discharge needle 4 is pulled out of the sealing member 3, in the sealing member 3, the peripheral surface 3*a* and the base end face 3*b* of the sealing member 3 are locked by the first peripheral wall section 27 and the second peripheral wall section 28. Therefore, the sealing member 3 can be prevented from being pulled out of the stopper member 2. Moreover, since the second peripheral wall section 28 locks the sealing member 3 in such a manner as to tighten the sealing member 3, the stopper can withstand plural times of insertion/extraction of the discharge needle 4.

In this embodiment, the second peripheral wall section 28 is provided with the protrusion 28*a* on the outer surface of the tip end portion and the protrusion 28*b* on the inner surface of the tip end portion. However, the protrusion 28*a* and the protrusion 28*b* may be provided at other portions, or neither of them may be provided.

The number of the first peripheral wall sections 27 and that of the second peripheral wall sections 28 are set to two, respectively. However, the number is not limited and may be any numbers.

The second peripheral wall section 28 is configured so as to gradually open radially outward along a direction opposite to the direction A in which the stopper member 2 is inserted into the guiding path 10 of the stopper main body 1. However, the second peripheral wall section 28 may be configured so as to gradually open radially outward along the direction A in which the stopper member 2 is inserted into the guiding path 10 of the stopper main body 1 or along another direction. Note that in cases where the stopper member 2 gradually opens radially outward along a direction opposite to the direction A in which guiding path 10 of stopper main body 1 is inserted, the second peripheral wall section 28 is gradually bent radially inward as the stopper member 2 is inserted into the guiding path 10 of the stopper main body 1 and therefore it is preferable.

Although the embodiment of the present invention was described with reference to the drawings, the present invention is not limited to the embodiment shown in the drawings. Various modifications and variations may be made to the illustrated embodiment within the same scope as the present invention or within the equivalent scope.

DESCRIPTION OF REFERENCE SYMBOLS s

- 1: stopper main body
  - 1*a*: tip end portion
  - 1*b*: base end portion
  - 10: guiding path
  - 11: annular rib
- 2: stopper member
  - 2*a*: tip end portion
  - 2*b*: intermediate portion
  - 2*c*: base end portion
  - 21: partition wall
  - 22: flow path
  - 23: airtightness maintaining portion
  - 24: flow opening
  - 26: recess
  - 27: first peripheral wall section
    - 27*a*: protrusion
  - 28: second peripheral wall section
    - 28*a*: protrusion (outer side)
    - 28*b*: protrusion (inner side)
  - 29: third peripheral wall section
- 3: sealing member
  - 3*a*: peripheral surface
  - 3*b*: base end face
- 4: discharge needle

The invention claimed is:

1. A stopper comprising:

a stopper main body having a guiding path extending in an axial direction;

a stopper member having a flow path extending in the axial direction and configured to be inserted in the guiding path of the stopper main body; and a sealing member to be inserted in the flow path of the stopper member in such a manner as to close the flow path, wherein the stopper member is provided with, at a position where the sealing member is inserted, a first peripheral wall section fixed at first and second ends in such a manner as to extend in the axial direction and a second peripheral wall section separated from the first peripheral wall section in a circumferential direction and fixed at a first end and open at a second end, the second end extending obliquely radially outward along the axial direction.

2. The stopper as recited in claim 1, wherein the second peripheral wall section is provided with a protrusion protruding radially outward or radially inward on an outer surface thereof or an inner surface thereof.

3. The stopper as recited in claim 2, wherein the second peripheral wall section is provided with a protrusion protruding radially inward on an inner surface of a tip end portion thereof.

4. The stopper as recited in claim 1, wherein the stopper member is provided with an annular third peripheral wall section having rigidity at a base end portion thereof and the first peripheral wall section is connected to the third peripheral wall section.

5. A container provided with the stopper as recited in claim 1.

6. The stopper as recited in claim 1, wherein the stopper member includes a tip end portion and a base end portion.

7. The stopper as recited in claim 6, wherein the first end of the first peripheral wall section is fixed to the tip end portion and the second end of the first peripheral wall section is fixed to the base end portion.

8. The stopper as recited in claim 1, wherein the stopper member includes an airtightness maintaining portion positioned opposite the second end of the second peripheral wall section.

9. The stopper as recited in claim 1, wherein the stopper member includes a recess formed on a tip end portion thereof.

10. The stopper as recited in claim 9, wherein the stopper main body includes an annular rib to fit into the recess of the stopper member.

11. The stopper as recited in claim 1, wherein the sealing member has a length shorter than a length of the second peripheral wall section.

* * * * *